May 26, 1964　　　F. O. W. ARNTZ　　　3,134,417
PROTECTIVE DEVICES FOR PNEUMATIC VEHICLE TIRES
Filed Oct. 30, 1962　　　　　　　　　　2 Sheets-Sheet 1
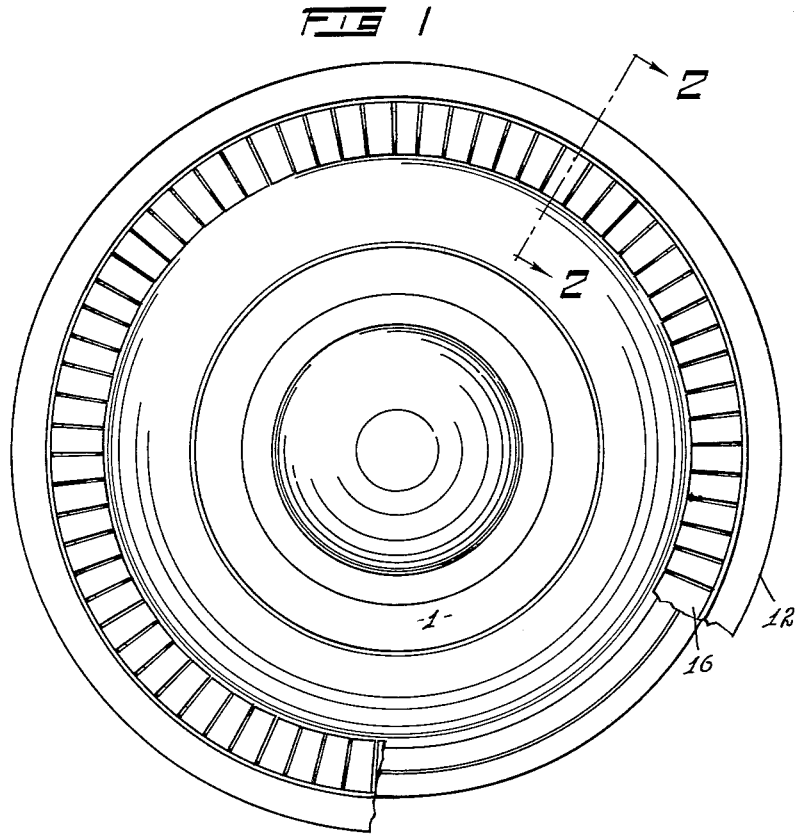
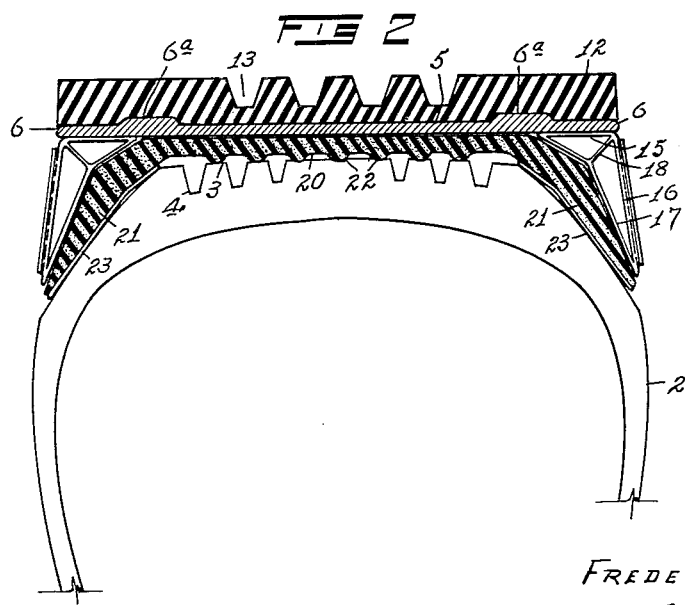
INVENTOR,
FREDERICK O. W. ARNTZ
BY
ATTORNEYS May 26, 1964 F. O. W. ARNTZ 3,134,417
PROTECTIVE DEVICES FOR PNEUMATIC VEHICLE TIRES
Filed Oct. 30, 1962 2 Sheets-Sheet 2
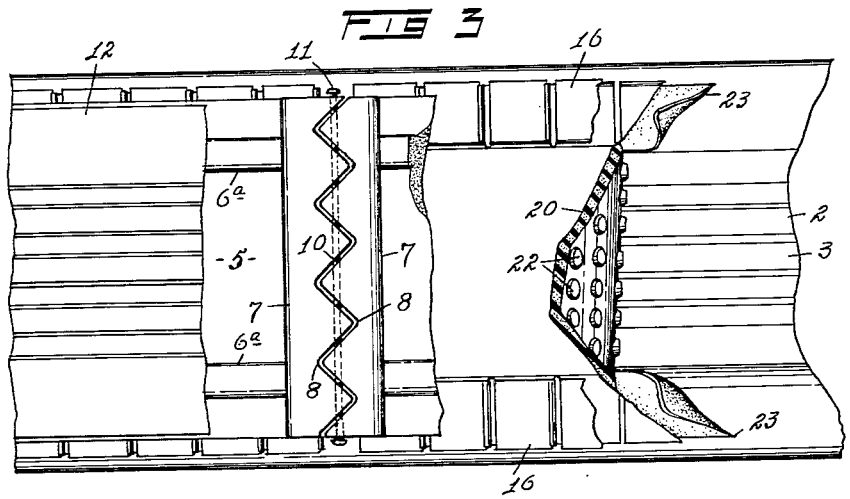
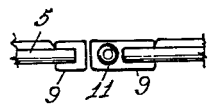
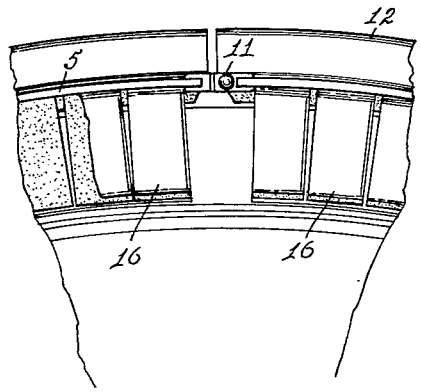
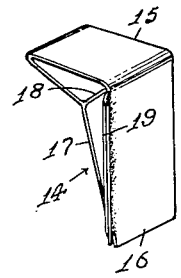
INVENTOR,
FREDERICK O. W. ARNTZ
BY *Imrie and Smiley*
ATTORNEYS

United States Patent Office 3,134,417
Patented May 26, 1964

3,134,417
PROTECTIVE DEVICES FOR PNEUMATIC
VEHICLE TIRES
Frederick O. W. Arntz, 423 Brunswick Ave.,
Toronto, Ontario, Canada
Filed Oct. 30, 1962, Ser. No. 234,132
3 Claims. (Cl. 152—175)

The invention relates to improvements in protective devices for pneumatic vehicle tires.

The primary object of the invention is to provide a device particularly adapted for use on heavy duty tires, which will effectively protect the tread of the tire against wear, puncture, or damage by reason of contact with objects with which tires having direct contact with road surfaces are normally subjected.

Another important object of the invention is to provide a tire protector which can be used advantageously on a vehicle equipped with tires whose outside diameters do not coincide, such, for instance, as where new tires are used with tires having badly worn treads, by the provision of simple means for filling in the spaces between the tires and the puncture-proof tire protectors to compensate for variations in the tire sizes, whereby the diameters of all tires on a vehicle will be in correspondence.

A further important object of the invention is the provision of simple and effective means for holding the tire protector to its adjusted position on a tire against lateral or longitudinal displacement.

Another object of the invention is to provide a device of the class described which can be readily attached to and removed from a tire without the use of special tools.

And generally the objects of the invention are to provide an overtire of simple and sturdy construction, efficient and quiet in operation and which can be produced at reasonable cost.

With the above and other objects in view, the invention consists in the novel features of construction, arrangements and combinations of parts set out in the present specification, shown in the drawings and more particularly pointed out in the claims for novelty following.

In describing the invention reference will be made to the accompanying drawings in which:

FIGURE 1 is a side elevational view of a vehicle wheel equipped with my tire protective device, a portion of the latter being broken away.

FIGURE 2 is a cross sectional view on an enlarged scale, taken on the line 2—2 of FIGURE 1.

FIGURE 3 is a fragmentary top plan view with the several superimposed layers of materials comprising the protective device broken away and some turned backwards to make clear the relation of component parts.

FIGURE 4 is a fragmentary edge elevation of the means for locking together the ends of the puncture proof belt.

FIGURE 5 is a fragmentary side elevation on an enlarged scale showing the locking means of FIGURE 4 applied to the protective device on a tire.

FIGURE 6 is a perspective view of one of the metal elements employed to prevent lateral displacement of the tire protector.

Like numerals of reference indicate corresponding parts in the various figures.

Referring to the drawings, 1 and 2 denote, respectively, a wheel and pneumatic tire of conventional type, the tire being herein shown as having a tread portion comprising circumferentially extending alternately arranged ribs 3 and grooves 4.

My protective device consists of a band 5 of a puncture-proof material, such, for instance, as a perforated metal plate, or a closely woven wire element, which is adapted for arrangement circumferentially of a tire. The band 5 is of greater width than the tire tread and has marginal portions 6 which extend outwards beyond the tire at each side of the latter. The band 5 is provided with ribs 6a, herein shown as two in number, extending lengthwise of the band in spaced relation to each other and being for the purpose of reinforcing the band. The band 5 is adapted to extend circumferentially of the tire and to have its ends secured together by means which permit of ready disconnection of said ends when such is desired.

As means to provide for ready connection and disconnection of the ends of the band 5 said band is provided at its ends with transversely arranged plates 7 which are secured by welding, or otherwise, to the band near its ends and which extend outwardly beyond the ends of the band and have their opposing edges transversely of the band, as at 8, notched or otherwise formed, for interfitting engagement with one another when the said plates are drawn tightly together. The plates 7 have end marginal parts 9 turned inwards at right angles to their top surfaces and the inturned marginal part 9 of one plate at one side edge of the band and the inturned marginal part of the other plate at the other side edge of the band are apertured for the reception of a rod 10 which may be passed through said apertures to lock the ends of the band 5 together. The rod 10 is held against endwise movement by heads 11, one or both of which may be threaded onto the rod which is threaded for the purpose.

A tread member 12 of a width corresponding substantially to that of the puncture-proof band 5 is vulcanised, or otherwise secured to the said band with the ribs 6a embedded in the inner surface thereof to prevent lateral displacement of the tread. The tread member may, of course, be provided with a suitable tread design, such as by the provision of circumferential grooves 13, to provide a non skid effect.

As means to prevent side slip or lateral displacement of the tread protecting band 5 there are provided at the sides of the device hollow, generally triangular shaped frame like devices, indicated generally at 14, which are carried by the puncture-proof band and which include side members which extend inwards in slightly spaced edgewise relation to each other across the sides of the tire tread.

The retaining devices 14 are identical in form and each is formed preferably of aluminum, extruded or otherwise provided, to provide a narrow plate, 15, welded or otherwise secured to the inner surface of the band 5 and extending to the outer edge of said band, a wall 16 extending inwardly at right angles to the plate 15 and being adapted to extend inwards over the sides of the tread portion of the tire, an inwardly and backwardly inclined wall 17 connected to the inner end of the wall 16 and diverging from said point of connection, and from a point beyond its longitudinal centre extending inwards into meeting engagement with the inner end of the part 15, the said frame-like member being braced by an interior web 18 extending between the walls 16 and 17.

In order to allow air to pass to the interiors of the generally triangular shaped tread retaining members 14 for cooling purposes corresponding side edges 19 of the walls 16 are turned outwards, as shown clearly in FIGURE 6, to provide narrow air passages between adjacent walls 16.

It will have been noted from the foregoing description that the puncture-proof band 5 is not susceptible of lengthwise adjustment but that one of such devices having a set lengthwise dimension is adapted for application to tires of different diameters. To permit of such application means is provided for filling the space between the tread of a tire and inner surface of a protective band 5 whose inside diameter is greater than the outside diameter of said tire.

As means for compensating for the difference in diameters between a tire having an outside diameter less than the inside diameter of the band 5 to be applied thereto, I provide a pad 20 composed preferably of soft rubber, of the required length to encircle the tire within the protective device and being of sufficient width to lie across the tread portion of the tire and to provide marginal parts 21 to extend inwards over adjoining portions of the tire to points slightly beyond the ends of the walls 16. The portion of the pad 20 which lies between the tire tread and the band 5 is of somewhat greater thickness than the space between the tread and the band so as to be placed under compression when the band is placed thereover and the marginal parts 21 are of the required thickness to seal the spaces between the inclined walls 7 and the sides of the tire. The pad 20 is provided on the lower face of its medial portion which lies over the tire tread with a plurality of bosses 22 which are adapted on application of exterior pressure on the pad by the band 5 to be forced into sealing engagement with the tire surface, entering cracks and other surface fractures in the tire surface and so hold the pad frictionally against movement on the tire.

The pad 20 preferably has its inwardly extending marginal portions 21 spaced from the sides of the tire which lie thereunder by means of sheets 23 of a self-lubricating material, such as Teflon, whereby to allow relative sliding movement between the pad and the tire.

The rubber pad with its exterior bosses 22 serves two purposes, one being to provide a filler between the protective band and the tread, and the other purpose is to provide a frictional grip for the protective device on the tire.

In order to apply my protective device to a tire it is necessary only to simply first ascertain the outside diameters of the respective tires and then to place around each tire a pad 20 of thickness somewhat greater than the difference between the outside diameter of the tire and the inside diameter of the puncture-proof band 5 and to then place the protective member over the filler pad 20 with the side members extending inwards over the side walls of the tire and abutting the marginal parts 21 of the pad 20 and to then draw the clasp members 7 into position with their notched portions into interfitting engagement, in which position the apertures in the ends of said members will be in register, upon which the ends of the band 5 can be effectively locked together by inserting the rod 10 through the registering apertures in the ends of the members 7 and secured against dislodgement by means of the members 11. In this condition the tire tread will be effectively protected against wear and other damage and the band 5 will be securely held against displacement laterally by the side members which will also protect the side walls of the tire from damage through contact with curbs or other objects.

The protective device or overtire can readily be removed for any desired reason, such as for repair or for placement on another tire, by simply withdrawing the rod 10 from the members 7 and removing the band 5 with its attached side members.

It is apparent that by the provision of filler members of different thicknesses, a protective device of one size can be adapted to a wide range of tire sizes, therefore, but a small range of sizes of such protective devices will be required to accommodate all sizes of tires.

While I have shown herein and described the present preferred construction and arrangement of parts for carrying out my said invention, this is capable of variation and modification. I, therefore, do not wish to be limited to the precise details of construction set out herein but desire to avail myself of such variations and modifications as come within the scope of the appended claims.

What I claim as my invention is:

1. A protective device for a pneumatic vehicle tire, comprising a band of puncture-proof material adapted for arrangement circumferentially of a tire and to extend laterally beyond the tire tread at opposite sides thereof, means for connecting together the ends of said band, rigid band retaining means secured to said band and extending inwardly at right angles thereto across the tire at opposite sides thereof, a resilient tread member secured over the outer surface of said band, a pad of a resilient material adapted to extend circumferentially of the tire over the tread and sides thereof between the tire tread and said band and between the sides of the tire and said band retaining means, spacing members of a self-lubricating material positioned over the sides of the tire between said sides and the portions of said resilient pad which extend over said sides, said resilient pad having spaced compressible bosses on its face remote from said band, said resilient pad being of somewhat greater thickness than the space between said tire tread and said band whereby to be compressed when the ends of said band are connected together and so provide frictional connection between said band and said tire tread.

2. In a protective device for pneumatic vehicle tires, a resilient annular pad comprising a central portion adapted to envelop the tread portion of the tire and lateral marginal portions adapted to extend inwards over the side walls of the tire, said central portion of said pad having spaced bosses integral therewith engaging the tread of the tire and to be compressible into firm engagement therewith, spacing sheets of a self-lubricating material positioned on the sides of the tire between the tire walls and said lateral marginal portions of said pad, a transversely rigid annular band of a puncture resisting material arranged circumferentially of the tire on said central portion of said resilient pad and projecting laterally beyond said central portion at the sides of the tire, a plurality of rigid plates carried by and extending inwardly at right angles to said band at opposite side edges thereof, said plates at each side of said band being edgewise aligned with one another and being adapted to extend across the side walls of the tire, said plates having inwardly and backwardly turned extensions of their lower ends adapted to engage over said lateral marginal portions of said pad, means for connecting together the ends of said band, and a resilient tread member secured over the outer surface of said band.

3. A protective device for a pneumatic vehicle tire, according to claim 2, characterised in that the corresponding edges of said plates are formed to provide inlets for air between each two adjacent plates at each side of the tire.

References Cited in the file of this patent

UNITED STATES PATENTS

| | | |
|---|---|---|
| 1,050,624 | Distelhorst | Jan. 19, 1913 |
| 1,463,249 | Logan | July 31, 1923 |

FOREIGN PATENTS

| | | |
|---|---|---|
| 107,367 | Sweden | May 11, 1943 |